(12) United States Patent
Lee et al.

(10) Patent No.: US 7,566,514 B2
(45) Date of Patent: Jul. 28, 2009

(54) CATALYST FOR CATHODE IN FUEL CELL

(75) Inventors: Sung-hoon Lee, Kyungki-do (KR); Chan-ho Pak, Seoul (KR); Hyuk Chang, Kyungki-do (KR); Jai-kwang Shin, Kyungki-do (KR)

(73) Assignee: Samsung SDI Co., Ltd., Suwon, Kyungki-Do (KR)

( * ) Notice: Subject to any disclaimer, the term of this patent is extended or adjusted under 35 U.S.C. 154(b) by 485 days.

(21) Appl. No.: 10/685,797

(22) Filed: Oct. 16, 2003

(65) Prior Publication Data

US 2004/0161641 A1 Aug. 19, 2004

(30) Foreign Application Priority Data

Feb. 19, 2003 (KR) .................. 10-2003-0010383

(51) Int. Cl.
*H01M 4/44* (2006.01)
(52) U.S. Cl. .............. 429/44; 429/40; 429/41; 429/30; 429/33; 502/101; 204/293; 204/283; 204/284
(58) Field of Classification Search ........... 429/40, 429/41, 44, 30, 33; 204/293, 283, 284; 502/101; 420/525
See application file for complete search history.

(56) References Cited

U.S. PATENT DOCUMENTS

| | | | | |
|---|---|---|---|---|
| 4,072,727 A * | 2/1978 | Vanderspurt | ............ | 568/881 |
| 4,127,508 A * | 11/1978 | Vanderspurt | ............ | 502/243 |
| 4,312,792 A * | 1/1982 | Antos | ............ | 585/379 |
| 4,447,506 A | 5/1984 | Luczak et al. | | |
| 4,677,092 A | 6/1987 | Luczak et al. | | |
| 4,716,087 A * | 12/1987 | Ito et al. | ............ | 429/40 |
| 4,794,054 A | 12/1988 | Ito et al. | | |
| 5,079,107 A | 1/1992 | Jalan | | |
| 5,126,216 A | 6/1992 | Capuano et al. | | |
| 5,132,193 A * | 7/1992 | Reddy et al. | ............ | 429/13 |
| 5,916,702 A * | 6/1999 | Marucchi-Soos et al. | ..... | 429/44 |
| 6,111,134 A * | 8/2000 | Hara et al. | ............ | 560/201 |
| 6,165,635 A * | 12/2000 | Auer et al. | ............ | 429/40 |
| 6,245,707 B1 | 6/2001 | Chu et al. | | |
| 6,531,304 B1 * | 3/2003 | Bonnemann et al. | ..... | 435/173.9 |
| 6,573,214 B2 * | 6/2003 | Abdo et al. | ............ | 502/332 |
| 6,603,038 B1 * | 8/2003 | Hagemeyer et al. | ..... | 560/241.1 |
| 2001/0024634 A1 * | 9/2001 | Bertsch-Frank et al. | ..... | 423/584 |
| 2002/0034676 A1 * | 3/2002 | Kim et al. | ............ | 429/44 |
| 2003/0045425 A1 * | 3/2003 | Ruth et al. | ............ | 502/325 |
| 2003/0138680 A1 * | 7/2003 | Goebel et al. | ............ | 429/20 |
| 2003/0157393 A1 * | 8/2003 | Choi et al. | ............ | 429/40 |
| 2004/0038808 A1 * | 2/2004 | Hampden-Smith et al. | .. | 502/180 |
| 2005/0048356 A1 * | 3/2005 | Ihringer et al. | ............ | 429/44 |
| 2006/0054246 A1 * | 3/2006 | Guruswamy et al. | ........ | 148/108 |

FOREIGN PATENT DOCUMENTS

| | | |
|---|---|---|
| CA | 1329372 A | 1/2002 |
| JP | 4-358540 | 12/1992 |
| JP | 10-69914 | 3/1998 |
| JP | 11-144751 | 5/1999 |
| JP | 2000-323145 | 11/2000 |
| JP | 2001-068120 A | 3/2001 |
| JP | 2001-345107 A | 12/2001 |
| JP | 2002-100374 | 4/2002 |
| JP | 2002-305001 A | 10/2002 |
| JP | 2003-45442 | 2/2003 |
| JP | 2003-86188 | 3/2003 |
| KR | 2002-0084825 A | 11/2002 |
| WO | WO 01/068246 A1 | 9/2001 |

OTHER PUBLICATIONS

Manos Mavrikakis et al., *Oxygenate Reaction Pathways on Transition Metal Surfaces*, Journal of Molecular Catalysis A: Chemical, 1998, pp. 135-147, vol. 131, Elsevier Science B.V., Amsterdam, Holland.

Mark Barteau, *Linear Free Energy Relationships for $C_1$-Oxygenate Decomposition on Transition Metal Surfaces*, Catalysis Letters, 1991, pp. 175-184, vol. 8, J.C. Baltzer A.G. Scientific Publishing Company, Switzerland.

Korean Patent Office Action and English Translation.

Japanese Patent Office Action dated Dec. 6, 2005 with English Translation.

Official Action issued by Chinese Patent Office on May 8, 2009.

* cited by examiner

*Primary Examiner*—Bruce F Bell
(74) *Attorney, Agent, or Firm*—Buchanan Ingersoll & Rooney PC

(57) ABSTRACT

A catalyst particle having high oxygen reduction reactivity and low methanol oxidation reactivity, a supported catalyst comprising the catalyst particle, and a fuel cell using a cathode comprising the supported catalyst are provided. The whole catalyst particle or at least the surface of the catalyst particle includes an alloy of two or more metals selected from the group consisting of Fe, Co, Ni, Rh, Pd, Pt, Cu, Ag, Au, Zn, and Cd. The alloy has a stronger oxygen-binding force than platinum or a weaker hydrogen-binding force than platinum.

13 Claims, 1 Drawing Sheet

CATALYST FOR CATHODE IN FUEL CELL

BACKGROUND OF THE INVENTION

This application claims the priority of Korean Patent Application No. 2003-10383, filed on Feb. 19, 2003, in the Korean Intellectual Property Office, the disclosure of which is incorporated herein in its entirety by reference.

1. Field of the Invention

The present invention relates to a fuel cell, more particularly, to a direct methanol fuel cell, and even more particularly, to a catalyst for a cathode in a direct methanol fuel cell.

2. Description of the Related Art

Fuel cells are electrochemical devices which generate an electrical energy through electrochemical reaction of fuel and oxygen. Because they are not subjected to the thermodynamic limitations of the Carnot cycle, their theoretical power generating efficiencies are very high. Fuel cells may be used as sources of electric power for industrial, domestic, and automobile driving applications, as well as for electric/electronic products, in particular, portable devices.

Currently known fuel cells are classified into a polymer electrolyte membrane (PEM) type, a phosphoric acid type, a molten carbonate type, and a solid oxide type according to the types of electrolyte used in the cells. If the type of electrolyte is changed, the operation temperature and materials of constitutional elements of a fuel cell are changed.

Fuel cells are also classified into an external reforming type and an internal reforming type according to fuel feeding process. External reforming type fuel cells convert fuel into a hydrogen-rich gas using a fuel reformer before the fuel is delivered to an anode. Internal reforming type fuel cells, also known as direct fuel cells, allow gaseous or liquid fuel to be fed directly into an anode.

A representative example of the direct fuel cells is a direct methanol fuel cell (DMFC). In the DMFC, an aqueous methanol solution or a mixed vapor of methanol and water is mainly fed into an anode. Because the DMFC removes the need for an external reformer and has excellent fuel handling property, it is easier to overcome the problem of miniaturization than other fuel cells.

Electrochemical reactions involved in the DMFC include an anode reaction for oxidizing a fuel and a cathode reaction for reducing a hydrogen ion and oxygen. These reactions are summarized as follows:

Anode reaction: $CH_3OH+H_2O \rightarrow 6H^+ +6e^- +CO_2$
Cathode reaction: $1.5O_2+6H^+ +6e^- \rightarrow 3H_2O$
Overall reaction: $CH_3OH+1.5O_2 \rightarrow 2H_2O+CO_2$ As shown in the above reactions, methanol and water react with each other to produce carbon dioxide, six hydrogen ions, and six electrons at the anode. The generated hydrogen ions travel through a hydrogen ion conducting electrolyte membrane, which is positioned between the anode and the cathode, to the cathode. At the cathode, the hydrogen ions, electrons from an external circuit, and oxygen react to produce water. The overall reaction in the DMFC is to produce water and carbon dioxide by the reaction of methanol and oxygen. Through these reactions, a large portion of energy corresponding to the heat of combustion of methanol is converted to an electrical energy. In order to facilitate these reactions, both the anode and the cathode of the DMFC comprise catalysts.

The hydrogen ion conducting electrolyte membrane acts as a channel through which the hydrogen ions generated by an oxidation reaction at the anode can pass. At the same time, the hydrogen ion conducting electrolyte membrane acts as a separator to separate the anode and the cathode. Generally, the hydrogen ion conducting electrolyte membrane exhibits an ionic conductivity when moisturized with an appropriate amount of water due to its hydrophilicity.

A portion of methanol fed into the anode diffuses into the hydrophilic hydrogen ion conducting electrolyte membrane and then travels to the cathode. This phenomenon is referred to as "methanol cross-over". A platinum catalyst, which facilitates both the reduction of oxygen and oxidation of methanol, is mainly used for the cathode of the DMFC, and thus methanol delivered to the cathode by the cross-over may undergo oxidation. Such oxidation of methanol at the cathode may significantly lower the performance of the DMFC.

In order to solve this problem, many efforts have been made to develop a hydrogen ion conducting electrolyte membrane capable of preventing permeation of methanol, on one hand, and to develop a catalyst for a cathode having less reactivity with methanol, on the other hand.

By way of an example of the latter, U.S. Pat. No. 6,245,707 discloses a catalyst material comprising transition metal-containing nitrogen chelates.

A currently widely used catalyst for a cathode in the DMFC is platinum particles. In this regard, a catalyst made of a metal alloy may be more advantageous than that made of nitrogen chelates, for good compatibleness with conventional DMFC manufacturing methods.

Examples of a metal alloy catalyst for a cathode in a fuel cell include a Pt—Rh—Fe alloy catalyst as disclosed in U.S. Pat. No. 6,165,635; a Pt—Cr—Cu alloy catalyst as disclosed in U.S. Pat. No. 5,126,216; Pt—Ni—Co and Pt—Cr—Co alloy catalysts as disclosed in U.S. Pat. No. 5,079,107; a Pt—Cu alloy catalyst as disclosed in U.S. Pat. No. 4,716,087; Pt—Cr—Co and Pt—V—Co alloy catalysts as disclosed in U.S. Pat. No. 4,677,092; and a Pt—Co—Cr alloy catalyst as disclosed in U.S. Pat. No. 4,447,506.

However, these alloy catalysts were developed for cathodes in PAFCs, which use phosphoric acid as an electrolyte, to stably facilitate oxygen reduction under an acidic condition. There are no reports about developments of catalysts having less reactivity with methanol.

SUMMARY OF THE INVENTION

The present invention provides a catalyst particle having high oxygen reduction reactivity and low methanol oxidation reactivity.

The present invention also provides a supported catalyst comprising a catalyst particle having high oxygen reduction reactivity and low methanol oxidation reactivity.

The present invention also provides a fuel cell using a cathode comprising the supported catalyst.

According to an aspect of the present invention, there is provided a catalyst particle for a cathode of fuel cells, wherein the whole particle or at least the surface of the particle comprises an alloy of two or more metals selected from the group consisting of Fe, Co, Ni, Rh, Pd, Pt, Cu, Ag, Au, Zn, and Cd. The alloy has a stronger oxygen-binding force than platinum or a weaker hydrogen-binding force than platinum.

According to another aspect of the present invention, there is provided a supported catalyst comprising an electroconductive, porous carrier having micropores; and the above-mentioned catalyst particle dispersed in the pores of the carrier.

According to yet another aspect of the present invention, there is provided a fuel cell comprising a cathode for reducing an oxidizing agent, an anode for oxidizing a fuel, and an electrolyte membrane being placed between the cathode and the anode, wherein the cathode comprises the aforementioned supported catalyst.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION OF THE INVENTION

Figure 1:
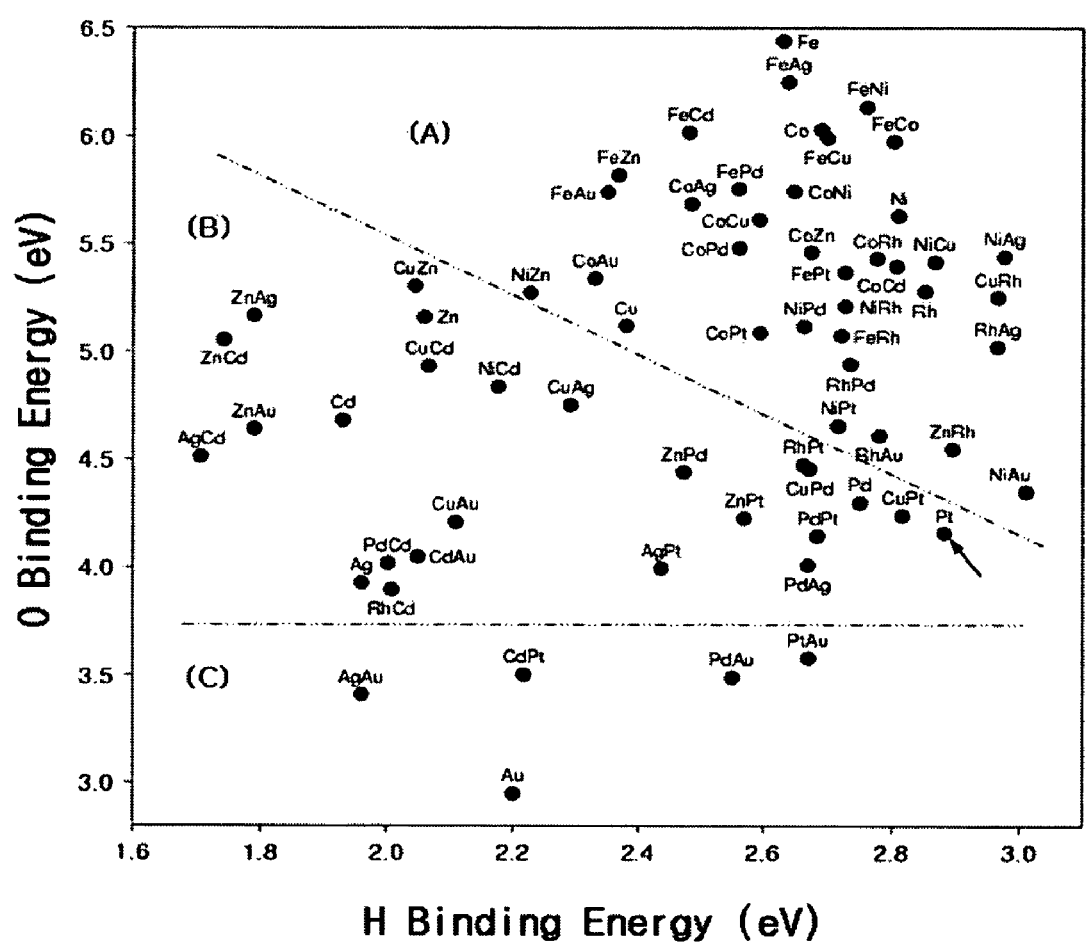
FIG. 1 is a diagram showing the oxygen- and hydrogen-binding forces of catalyst particles according to an embodiment of the present invention.

In a direct methanol fuel cell (DMFC), a catalyst for a cathode must have low methanol oxidation reactivity and high oxygen reduction reactivity.

With respect to a methanol oxidation reaction, methanol ($CH_3OH$) adsorbed on the surface of a catalyst particle undergoes the reaction steps represented in the following scheme 1:

Scheme 1

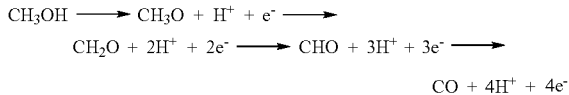

It is reported that a decomposition reaction of $CH_3O$ is the rate-determining step in Scheme 1 [M. Mavrikakis and M. A. Barteau, J. of Molecular Catalysis A, 131, 135 (1998)]. The decomposition temperature of $CH_3O$ increases with increase of the binding force between a catalyst particle and oxygen and with decrease of the binding force of a catalyst particle and hydrogen [M. A. Barteau, Catal. Lett. 8, 175 (1991)].

In order to reduce the methanol oxidation reactivity of a catalyst particle, a high decomposition temperature of $CH_3O$ is required. In this regard, it is advantageous to increase the binding force of a catalyst particle to oxygen and/or decrease the binding force of a catalyst particle to hydrogen.

An oxygen reduction reaction pathway is as the following scheme 2:

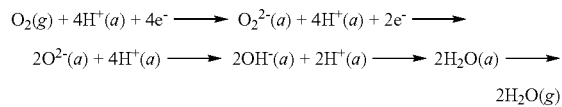

In Scheme 2, (g) represents a gas phase and (a) represents an adsorbed phase on the surface of a catalyst particle. In order to facilitate an oxygen reduction reaction, it is preferable that oxygen molecules be easily adsorbed on the surfaces of catalyst particles and the adsorbed oxygen molecules be easily decomposed into oxygen atoms. For this, a strong binding force between oxygen and a catalyst particle is required. In addition, in order to facilitate the conversion of oxygen atoms into water, it is preferable that hydrogen be easily desorbed from the surfaces of catalyst particles, and then associate with oxygen atoms or OH radicals. For this, a weak binding force between hydrogen and a catalyst particle is required.

Consequently, in order to increase the oxygen reduction reactivity of catalyst particles, it is advantageous to increase the binding force between oxygen and catalyst particles and/or decrease the binding force between hydrogen and catalyst particles. These conditions are the same as those for low methanol oxidation reactivity of catalyst particles.

The present inventors found that catalytic particles comprising an alloy of two or more metals selected from the group consisting of Fe, Co, Ni, Rh, Pd, Pt, Cu, Ag, Au, Zn, and Cd have a stronger oxygen-binding force than platinum or a weaker hydrogen-binding force than platinum.

FIG. 1 shows a hydrogen binding force and an oxygen binding force for binary alloy catalyst particles comprising two metals selected from the group consisting of Fe, Co, Ni, Rh, Pd, Pt, Cu, Ag, Au, Zn, and Cd, as calculated using a molecular modeling based on the quantum mechanics. In this case, because each of a methanol molecule and an oxygen molecule reacts with a portion of the surface of an alloy catalyst particle, the catalyst particle was modeled as a crystal and then the binding force of hydrogen or oxygen on the surface of the crystal was calculated. More particularly, face centered cubic based CuAu structure was used as the crystal structure and the binding forces of hydrogen and oxygen were calculated at the (100) and (111) surfaces. A hydrogen binding force and an oxygen binding force according to alloy components assumed almost the same phases at both the surfaces. FIG. 1 shows a hydrogen binding energy and an oxygen binding energy at the (100) surface of the CuAu structure.

In FIG. 1, the vertical axis represents the oxygen binding force for catalyst particles, the horizontal axis represents the hydrogen binding force for catalyst particles, alphabets marked on points indicate the corresponding alloy components, and arrow represents a platinum catalyst particle. An atomic ratio of the components in each alloy catalyst particle is 1:1.

As shown in FIG. 1, the points which represent catalyst particles made of different binary alloys, are distributed in three areas, (A), (B), and (C). Alloy catalyst particles distributed in these three areas have a stronger oxygen-binding force than platinum or a weaker hydrogen-binding force than platinum.

The alloy catalyst particles in the area (A) have a hydrogen binding force similar to platinum but an oxygen binding force much higher than platinum. As a result, they have the higher temperature of $CH_3O$ decomposition than platinum. Consequently, they exhibit lower methanol oxidation reactivity when compared to a platinum catalyst particle, thus reducing overvoltage by the cross-over of methanol.

The alloy catalyst particles in the area (C) have an oxygen binding force slightly lower than platinum but a hydrogen binding force much lower than platinum. As a result, they have the higher temperature of $CH_3O$ decomposition than platinum. Consequently, they exhibit lower methanol oxidation reactivity when compared to a platinum catalyst particle, thus reducing overvoltage by the cross-over of methanol.

The alloy catalyst particles in the area (B) have an oxygen binding force higher than platinum and a hydrogen binding force lower than platinum. As a result, they have a higher temperature of $CH_3O$ decomposition, higher oxygen adsorptivity, and higher oxygen reduction reactivity, when compared to platinum. Consequently, they exhibit lower methanol oxidation reactivity when compared to a platinum catalyst particle, thus reducing overvoltage by the cross-over of methanol. Furthermore, because they exhibit oxygen reduction reactivity higher than a platinum catalyst particle, the efficiency of a fuel cell can be increased much more.

Preferably, an alloy contained in the whole or at least the surface of a catalyst particle may be a binary alloy selected from the group consisting of Cd and Au; Cd and Ag; Cd and Cu; Cd and Ni; Cd and Pd; Cd and Pt; Zn and Au; Zn and Ag; Zn and Cu; Zn and Ni; Zn and Pd; Zn and Pt; Cu and Pd; Cu and Pt; and Ag and Pt.

Although catalyst particles made of binary alloys are shown in FIG. 1, the present invention can also be applied to catalyst particles made of alloys of three or more metals selected from the group consisting of Fe, Co, Ni, Rh, Pd, Pt, Cu, Ag, Au, Zn, and Cd.

According to the present invention, the whole catalyst particle may comprise an alloy of two or more metals selected from the group consisting of Fe, Co, Ni, Rh, Pd, Pt, Cu, Ag, Au, Zn, and Cd.

Alternatively, at least the surface of the catalyst particle may comprise an alloy of two or more metals selected from the group consisting of Fe, Co, Ni, Rh, Pd, Pt, Cu, Ag, Au, Zn, and Cd. This is because the oxygen binding force or the hydrogen binding force of the catalyst particle is determined by the surface component of the catalyst particle which binds with oxygen or hydrogen. That is, although the inner portion of the catalyst particle has any compositions, when the surface of a catalyst particle is coated with an alloy of two or more metals selected from the group consisting of Fe, Co, Ni, Rh, Pd, Pt, Cu, Ag, Au, Zn, and Cd, the objects of the present invention can be accomplished.

There are no particular limitations to an atomic ratio of metal components constituting an alloy contained in the catalyst particle of the present invention. However, when the content of one metal component is extremely high or extremely low, a desired effect as an alloy catalyst cannot be accomplished.

In this regard, as for a binary alloy of two metals selected from the group consisting of Fe, Co, Ni, Rh, Pd, Pt, Cu, Ag, Au, Zn, and Cd, it is preferable that the atomic % of one metal component be in a range of about 10 to 90.

The catalyst particle of the present invention can be manufactured by various methods disclosed in many documents. For example, first, two or more metal salts, which are used as metal precursors for alloy catalyst particles, are taken at amounts appropriate to provide a desired atomic ratio based on a metal content, and dissolved in distilled water to thereby prepare aqueous solutions of metal salts. The aqueous solutions of the metal salts are mixed while stirring at room temperature for three hours. After adjusting pH of the mixed solution to 8, a 2M aqueous solution of sodium borohydride ($NaBH_4$) as a reducing agent is added to the mixed solution at a time to obtain a precipitate. Finally, the precipitate is freeze-dried to thereby obtain an alloy catalyst particle.

The catalyst particle of the present invention is generally supported on micropores of a porous carrier to be used in a cathode for a fuel cell. The present invention provides a supported catalyst comprising an electroconductive, porous carrier having micropores and the above-mentioned catalyst particle positioned in the pores of the carrier.

Examples of the carrier include activated carbon powder, graphite powder, mesoporous carbon powder and carbon nano tube. The activated carbon powder may be Vulcan XC-72 or a ketjen black.

The supported catalyst of the present invention can be manufactured by various methods disclosed in many documents, and thus the detailed descriptions thereof are omitted.

The catalyst particle and supported catalyst of the present invention can be used in a polymer electrolyte membrane fuel cell (PEMFC), a phosphoric acid fuel cell (PAFC), and the like. In particular, they are very useful for the DMFC.

The present invention provides a fuel cell comprising a cathode for reducing an oxidizing agent, an anode for oxidizing a fuel, and an electrolyte membrane being placed between the cathode and the anode, wherein the cathode comprises the supported catalyst of the present invention.

The cathode comprises a catalyst layer to facilitate the reduction of oxygen. The catalyst layer comprises a catalytic particle or a supported catalyst and a cation exchange group-containing polymer.

The anode comprises a catalyst layer to facilitate the oxidation of a fuel such as hydrogen and methanol. The catalyst layer comprises a catalytic particle and a cation exchange group-containing polymer. Examples of a catalyst for the catalyst layer include a carbon supported platinum (Pt/C) catalyst and a carbon supported platinum-ruthenium (Pt—Ru/C) catalyst. In particular, the Pt—Ru/C catalyst is useful in a case where an organic fuel such as methanol is directly fed into the anode.

The catalyst layers of the cathode and the anode are in contact with the electrolyte membrane.

The cathode and the anode may further comprise a gas diffusion layer. The gas diffusion layer is made of a porous, electroconductive material. The gas diffusion layer acts as a current collector and a channel of reactants and products. The gas diffusion layer may be a carbon paper, preferably, a water-repellent carbon paper, and more preferably, a water-repellent carbon paper with a water-repellent carbon black layer. The water-repellent carbon paper comprises a hydrophobic polymer such as polytetrafluoroethylene (PTFE). The hydrophobic polymer is present in a state of being sintered. The water-repellency of the gas diffusion layer is to ensure channels for both polar liquid reactants and gaseous reactants. The water-repellent carbon black layer of the water-repellent carbon paper comprises a carbon black and a hydrophobic polymer, such as PTFE, as a hydrophobic binder. The water-repellent carbon black layer is attached on a surface of the water-repellent carbon paper. The hydrophobic polymer in the water-repellent carbon black layer is present in a state of being sintered.

The fuel cell of the present invention can be manufactured by various methods disclosed in many documents, and thus the detailed descriptions thereof are omitted.

As apparent from the above description, the catalyst particle or supported catalyst for a fuel cell of the present invention have excellent oxygen reduction reactivity and lower methanol oxidation reactivity, when compared to a platinum catalyst particle or a supported platinum catalyst.

In addition, the catalyst particle or supported catalyst for a cathode in a fuel cell of the present invention have enhanced oxygen reduction reactivity and lower methanol oxidation reactivity, when compared to a platinum catalyst particle or a supported platinum catalyst.

When the catalyst particle of the present invention is used in a fuel cell, the oxidation of cross-overred methanol at a cathode is decreased, thereby improving the performance of a fuel cell.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A supported catalyst suitable for use as a cathode of direct methanol fuel cells, comprising:
   an electroconductive, porous carrier having micropores; and catalyst particles positioned in the pores of the carrier comprising an alloy selected from the group consisting of Cd and Au; Cd and Cu; and Cd and Ni; wherein the alloy has a stronger oxygen-binding force than platinum or a weaker hydrogen-binding force than platinum.

2. The supported catalyst according to claim 1, wherein the alloy has a stronger oxygen-binding force than platinum and a weaker hydrogen-binding force than platinum.

3. The supported catalyst according to claim 1, wherein the porous carrier is graphite, mesoporous carbon powder or carbon nano tube.

4. The supported catalyst according to claim 1, wherein the oxygen-binding energy is at least 4.5 eV and/or the hydrogen-binding energy is at most 2.5 eV.

5. The supported catalyst according to claim 1, wherein the alloy comprises three or more metals, wherein the alloy further comprises Co, Ni, Rh, Cu, Ag, and/or Au.

6. A direct methanol fuel cell comprising:
a cathode;
an anode; and
an electrolyte membrane being placed between the cathode and the anode, wherein the cathode comprises the supported catalyst which comprises an electroconductive, porous carrier having micropores; and catalyst particles positioned in the pores of the carrier comprising an alloy selected from the group consisting of Cd and Au; Cd and Ag; Cd and Cu; Cd and Ni; and Cd and Pt; wherein the alloy has a stronger oxygen-binding force than platinum or a weaker hydrogen-binding force than platinum.

7. The direct methanol fuel cell according to claim 6, wherein the alloy has a stronger oxygen-binding force than platinum and a weaker hydrogen-binding force than platinum.

8. The direct methanol fuel cell according to claim 6, wherein the oxygen-binding energy is at least 4.5 eV and/or the hydrogen-binding energy is at most 2.5 eV.

9. The direct methanol fuel cell according to claim 6, wherein the alloy comprises three or more metals, wherein the alloy further comprises Co, Ni, Rh, Pt, Cu, Ag, Au, Zn and/or Cd.

10. A direct methanol fuel cell comprising:
a cathode;
an anode; and
an electrolyte membrane being placed between the cathode and the anode, wherein the cathode comprises the supported catalyst which comprises an electroconductive, porous carrier having micropores selected from the group consisting of graphite, mesoporous carbon powder, and carbon nano tube; and catalyst particles positioned in the pores of the carrier comprising an alloy selected from the group consist of Cd and Au; Cd and Ag; Cd and Cu; Cd and Ni; Cd and Pt; wherein the alloy has a stronger oxygen-binding force than platinum or a weaker hydrogen-binding force than platinum.

11. The direct methanol fuel cell according to claim 10, wherein the alloy has a stronger oxygen-binding force than platinum and a weaker hydrogen-binding force than platinum.

12. The direct methanol fuel cell according to claim 10, wherein the oxygen-binding energy is at least 4.5 eV and/or the hydrogen-binding energy is at most 2.5 eV.

13. The direct methanol fuel cell according to claim 10, wherein the alloy comprises three or more metals, wherein the alloy further comprises Co, Ni, Rh, Pt, Cu, Ag, Au, Zn and/or Cd.

* * * * *